United States Patent [19]

Kruger et al.

[11] Patent Number: 4,854,401
[45] Date of Patent: Aug. 8, 1989

[54] DRILL BIT DIRECT DRIVE FOR DEEP WELL DRILLING TOOLS

[75] Inventors: Volker Kruger, Celle; Heinrich Daenicke, Wienhausen, both of Fed. Rep. of Germany

[73] Assignee: Eastman Christensen Company, Salt Lake City, Utah

[21] Appl. No.: 172,590

[22] Filed: Mar. 24, 1988

[30] Foreign Application Priority Data

Mar. 25, 1987 [DE] Fed. Rep. of Germany ..... 37098403

[51] Int. Cl.$^4$ .......................... E21B 4/02; F16C 27/08
[52] U.S. Cl. .................................... 175/107; 175/320; 384/223; 415/903
[58] Field of Search .................. 175/107, 320; 384/37, 384/223, 225; 415/173 R, 501, 502

[56] References Cited

U.S. PATENT DOCUMENTS 4,629,013  12/1986  Krüger et al. ..................... 175/107

FOREIGN PATENT DOCUMENTS 2544032  10/1984  France ............................... 384/223
424958   10/1974  U.S.S.R. ............................ 175/107
442281   8/1975   U.S.S.R. ............................ 175/107

Primary Examiner—Jerome W. Massie
Assistant Examiner—David J. Bagnell
Attorney, Agent, or Firm—Arnold, White & Durkee

[57] ABSTRACT

A direct drive for well drilling tools is established which includes a friction bearing with a trace ring and a bearing ring. The bearing ring has a number of bearing segments distributed around its periphery. These bearing segments are supported so that they can be tilted and shifted axially. Each bearing segment includes a support part mounted in a bore of the bearing ring and a compression spring rod arranged in the bore of the bearing ring to provide tilting and axial shifting of the segment against a spring force.

19 Claims, 2 Drawing Sheets

DRILL BIT DIRECT DRIVE FOR DEEP WELL DRILLING TOOLS

BACKGROUND OF THE INVENTION

This invention concerns a drill bit direct drive for deep well drilling tools.

With a known drill bit direct drive of this type (German Patent No. 3,513,124 U.S. equivalent 4,629,013), the bearing segments are each arranged on a free end of a flexible bar that is part of the bearing ring. Such an axial bearing design is especially low in wear, because development of a convergent gap relative to the bearing segments in the direction of rotation of the bearing ring is possible due to the tiltability of the bearing segments, and the oil well fluid can form a film of lubricant in this gap. The bending bars are also suitable for withstanding very high loads, but they have a very low eqaulization of tolerance to the axial bearing per trace ring/bearing ring pair. In cases in which a relatively great equalization of tolerance by the axial bearing is necessary, the axial bearing may have to have a number of trace ring-/bearing ring pairs, which is in turn associated with a high cost and also with a substantial structural size of the axial bearing. If instead a favorable tolerance equalization is achieved by varying the spring characteristics and consequently the operating spring range, then the load bearing capacity of the axial bearing is reduced as is its lifetime, because the deflection angle becomes larger and thus the effective load transmitting friction contract face between the trace ring and the bearing segments becomes smaller.

This invention is based on the problem of creating a drill bit direct drive with an axial bearing that is suitable especially for very high axial loads and will yield a greater equalization of tolerance while maintaining the same load bearing conditions in the bearing as well as yielding favorable manufacturing conditions plus being easily adapted to different requirements.

The axial bearing of the drill bit direct drive according to this invention makes it possible for the bearing body to be shifted axially wiht a far greater operating spring range while maintaining the tiltability of the bearing body so a lubricant gap can be formed and thus the operating characteristics are favorable from the standpoint of wear, so the bearing yields a high equalization of tolerance. Its spring characteristic can be varied simply by means of the longitudinal and cross-sectional dimensions of the compression spring rod, so the axial bearing can easily be adapted to different requirements. At a high load bearing capacity of the axial bearing, the compression spring rods of the bearing segments assure an axial displacement independent of tilting displacement so there are no changes in load transmitting surfaces and thus the load conditions remain the same. Despite the relative length of the compression spring rods, the axial bearing according to this invention is compact in design, because as a rule the load bearing capacity adn the tolerance equalizing power of the axial bearing according to this invention eliminates the need for providing several trace ring-/bearing ring pairs one after the other axially.

An especially elegant possibility of reducing the axial structural height is provided by a design whereby the compression spring rod is supported in a tension tubular spring which can in turn be supported again in a compression tubular spring in another version. This telescopic spring combination, so to speak, permits not only a reduction in the axial structural height of the bearing ring but also makes it possible to vary the spring characteristics of the support of the bearing body of the bearing segments, e.g., to achieve a greater spring range.

BRIEF DESCRIPTION OF THE DRAWINGS

Additional details and advantages derive from the following description and the figures which show two practical examples of the object of this invention in diagram form. The figures show the following.

DETAILED DESCRIPTION OF A PREFERRED EMBODIMENT

Figure 1:
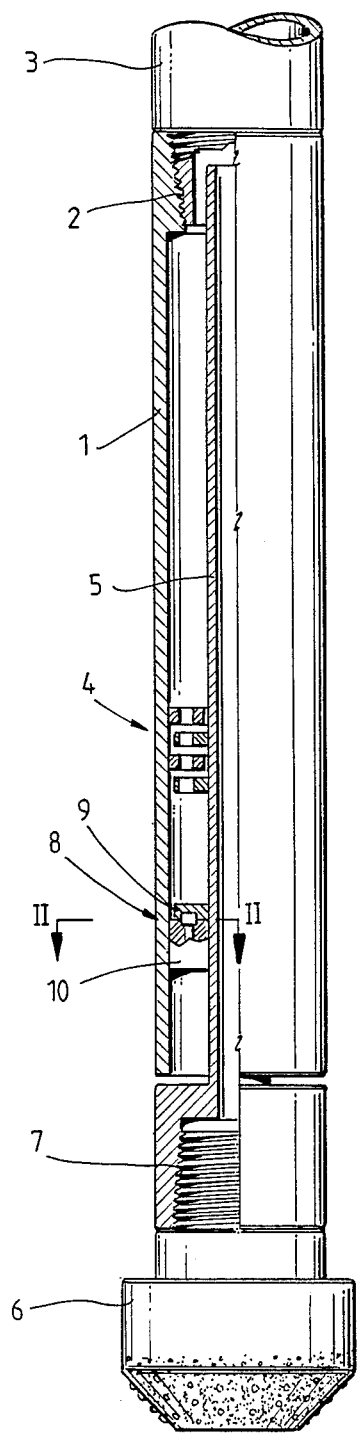
FIG. 1 shows a schematic diagram of a cutaway longitudinal section through a drill bit direct drive according to this invention.

The drill bit direct drive illustrated in FIG. 1 includes a tubular casing 1 that can be connected to a drill casing rod 3 by a thread 2. Inside housing 1 there is a rotary machine in the form of a turbine 4 that can be driven by oil well fluid flowing through it and the shaft 5 of this turbine projects axially out of casing 1 and has an external thread 7 for a screw connection with a rotary drill bit 6. In the example illustrated in FIG. 1, an axial bearing 8 which includes a trace ring 9 and a bearing ring 10 is provided to receive the axial forces acting on shaft 5. Basically it is also possible to provide two or more axial bearings 8 arranged axially one after the other instead of a single axial bearing, although the design of axial bearing 8 according to this invention can usually withstand whatever loads occur with drill bit direct drives or other deep well motors, which also includes displacement machines that operate according to the Moineau principle, without requiring a multiple arrangement of axial bearings.

Figure 3:
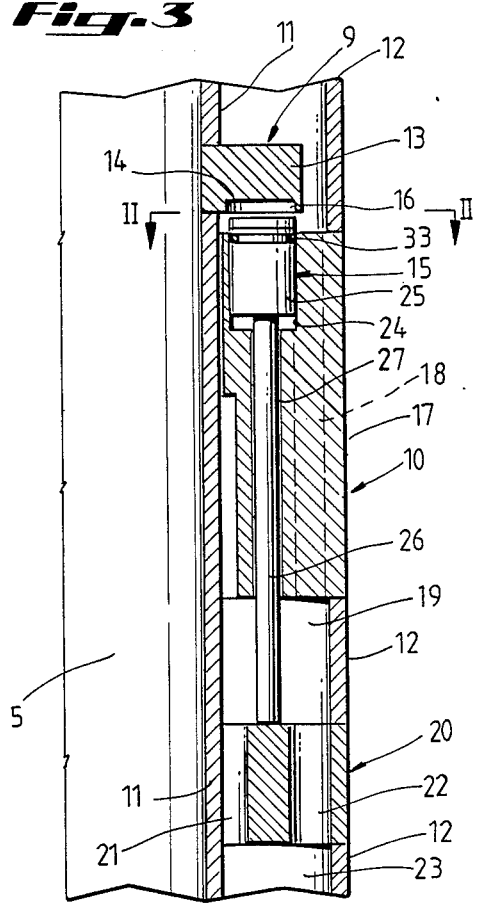
FIG. 3 shows a section according to line III-III in FIG. 2.

As FIG. 3 indicates in detail, trace ring 9 is supported on shaft 5 with the help of spacer 11, while bearing ring 10 is supported on the casing, likewise with spacers 12.

Trace ring 9 includes in detail a load bearing ring body 13, e.g., made of steel, which has a slideway 14 made of hard wear-resistant material, e.g., sintered metal, metal ceramic, polycrystalline diamond and/or combinations of such materials on the side facing bearing ring 10 in which case this slideway may be sintered on the ring in the form of a bed or it may also be formed from prefabricated segments.

Figure 2:
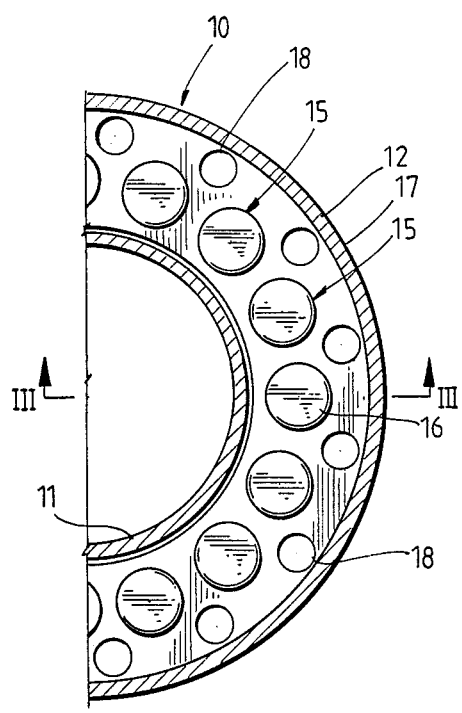
FIG. 2 shows a half sectional view according to line II—II in FIGS. 1 and 3.

Bearing ring 10 shown in detail in FIG. 2 includes a number of bearing segments 15 arranged in a regular distribution around its periphery, each having a bearing body 16 that is supported with respect to bearing ring 10 so that it can be tilted and shifted axially to a limited extent against the action of a restoring spring force.

The actual bearing ring body 17 has axial passages 18 arranged so they are radially outside bearing segments 15 in an annular space 19 between the lower side of bearing ring 17 and the top side of an abutment ring 20 in the example illustrated in FIG. 3. Abutment ring 20, which will be discussed in further detail below, is in turn provided with internal and external axial passages 21, 22 in the form of axial bores, so axial passage of oil well fluid through friction bearing 8 is not hindered in the annular space 23 between shaft 5 and casing 1.

As FIG. 3 also indicates, each bearing segment 15 includes a supporting part 25 that is held in an axial bore 24 of bearing ring 10 and supports friction body 16 at the back and may be made of steel, for example. Such support is desirable especially with bearing body elements which in turn have a matrix on the back side made of a hard sintered material, and they have a layer of polycrystalline diamond material on the side facing trace ring 9 or they have hard moldings countersunk or sintered into the matrix.

Supporting part 25 is in turn supported on its rear side by a thin axial straight compression spring rod 26 that acts on the middle from the rear and is in turn mounting in the axial bore 27 of the bearing ring 10 with a reduced diameter and it is secured in this axial bore to prevent buckling. Compression spring rod 26 is preferably made of titanium which has a high normal tension value and a low modulus of elasticity and is supported with its end facing away from supporting part 25 on an abutment which is formed by abutment ring 20 in the example according to FIG. 3.

As also indicated in this figure, compression spring rod 26 has a relatively alrge slenderness ratio L:D (length:diameter) which should be larger than 10, preferably larger than 15 and may preferably by 17, for example.

The separate abutment ring 20 in the example shown here can easily be positioned at a greater or smaller distance from bearing ring 10 by varying the spacer 12 provided between it and bearing ring 10, depending on the length given to compression spring rod 26 in particular. Essentially, however, it is also possible for the support for the lower end of compression ring rod 26 to be provided in the form of an abutment which forms an integral or separate part of the bearing ring 10.

Figure 4:
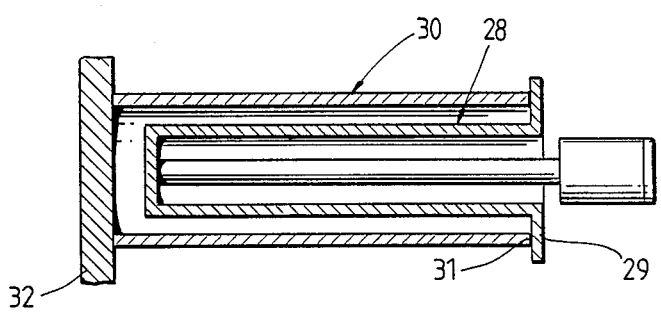
FIG. 4 shows an axial section through a bearing segment of a modified version in a cutaway single view.

A completely different possibility for the design of the abutment is illustrated in FIG. 4, whereby the abutment has the form of a tubular body 28 that is closed at its lower end and is provided at its upper end with a supporting flange 29 that projects radially outward, and this tubular body 28 holds compression spring rod 26 coaxially along essentially its entire length. Contrary to the diagram in FIG. 4, tubular body 28 then preferentially has an inside cross section that secures compression spring rod 26 against buckling.

Such a design makes it possible to support the compression spring rod 26 together with abutment 28 as the insert part in bearing ring 10 which would only have to be provided with appropriate axial bores. This design also permits easy adaptation in the case of varying rod lengths. However, if tubular body 28 preferentially forms a tension tubular spring which may be made of stainless spring steel, for example, but may also be made of titanium, then this design of two coaxial springs offers an important opportunity for reducing the structural height of the bearing segments 15 while maintaining the same spring properties or changing the spring properties, e.g., in the sense of enlarging the operating spring range or reducing the spring hardness.

As also indicated in FIG. 4 in another design of friction bearing 8, tubular body 28 may be placed coaxially inside another tubular body 30 that holds it essentially for its entire length namely so it is supported in suspension by means of supporting flange 29 on the upper edge 31 of the other tubular body 30. This other tubular body 30 is preferably a compression tubular spring and may be made of stainless spring steel, titanium, etc. The compression tubular spring 30 is supported on an abutment on the bearing ring side or separately as shown in FIG. 4 as a ring disk body 32, but is may also be formed from the bottom of an axial blind borehole in bearing ring 10.

In order to prevent oil well fluid from flowing through axial bores 24, 27 and forming deposits there which would interfere with the tilting and axial displacement movements of bearing segments 15, another measure provided is for the supporting part 25 of bearing segments 15 to be sealed with respect to axial bore 24 by a ring gasket 33, especially an O ring, in the area of the upper end.

What is claimed is:

1. Drill bit direct drive for deep well drilling tools with a tubular casing, a rotary machine that can be driven by oil well fluid flowing through it and is mounted inside the casing, a radially mounted shaft joined to this rotary machine and to a rotary drill bit and with at least one friction bearing that is exposed to the oil well fluid and is provided for axial mounting of the shaft and includes at least one trace ring supported on the shaft plus at least one bearing ring supported on the casing so it interacts with one trace ring and has a number of bearing segments distributed regularly around its periphery and including a bearing body supported with respect to the bearing ring so it can be tilted and shifted axially to a limited extent against the action of a restoring force, characterized by the fact that each bearing segment includes a support part mounted in an axial bore of the bearing ring and a slender axial straight compression spring rod supporting the supporting part in the middle on the rear and in turn arranged in an axial bore of the bearing ring which has a reduced diameter than that within which said support part is mounted and secured against buckling in the axial bore and supported with its end that faces away from the support part on an abutment.

2. Drill bit direct drive according to claim 1, characterized by the fact that the compression spring rod has a slenderness ratio L:D greater than 10.

3. Drill bit direct drive according to claims 1 or 2, characterized by the fact that the compression spring rod is made of titanium.

4. Drill bit direct drive according to one of claims 1 or 2, characterized by the fact that the abutment is an integral part of the bearing ring.

5. Drill bit direct drive according to one of claims 1 or 2, characterized by the fact that the abutment is formed by an abutment ring separate from the bearing ring.

6. Drill bit direct drive according to claim 5, characterized by the fact that the abutment ring is supported on casing over a spacer at some distance beneath the bearing ring.

7. Drill bit direct drive according to claim 1, characterized by the fact that the abutment has the shape of a tubular body that is closed at its lower end and is provided with a bearing flange that projects radially outward at its upper end and the tubular body holds the compression spring rod coaxially along essentially its entire length.

8. Drill bit direct drive according to claim 7, characterized by the fact that the tubular body has an inside cross section that secures the compression spring rod against buckling.

9. Drill bit direct drive according to claim 7, characterized by the fact that the tubular body is designed as a tension spiral element.

10. Drill bit direct drive according to claim 9, characterized by the fact that tension spiral element is made of stainless spring steel.

11. Drill bit direct drive according to claim 7, characterized by the fact that the tubular body is held in an axial bore of the bearing ring and is supported on it so it can be extended axially.

12. Drill bit direct drive according to claim 7, characterized by the fact that the tubular body is supported inside another tubular body that holds it essentially coaxially for its entire length so it is suspended by means of its supporting flange on the upper edge of the other tubular body.

13. Drill bit direct drive according to claim 12, characterized by the fact that the other tubular body forms a compression tubular spring.

14. Drill bit direct drive according to claim 13, characterized by the fact that the compression tubular spring is made of stainless spring steel.

15. Drill bit direct drive according to claim 12, characterized by the fact that the compression tubular spring is supported on an abutment on the bearing ring side.

16. Drill bit direct drive according to claim 1, characterized by the fact that the bearing ring is provided with axial passages for the oil well fluid.

17. Drill bit direct drive according to claim 1, characterized by the fact that the separate abutment ring is provided with axial passages for oil well fluid.

18. Drill bit direct drive according to claim 1, characterized by the fact that the axial bore that holds the bearing segment in the bearing ring is designed as a through hole.

19. Drill bit direct drive according to claim 18, characterized by the fact that the bearing part of the bearing segments is sealed with respect to the axial bore by a ring gasket in the area of its upper end.

* * * * *

UNITED STATES PATENT AND TRADEMARK OFFICE
CERTIFICATE OF CORRECTION

PATENT NO. : 4,854,401
DATED : August 8, 1989
INVENTOR(S) : Volker Kruger and Heinrich Daenicke It is certified that error appears in the above-identified patent and that said Letters Patent is hereby corrected as shown below:

In column 1, line 18, after "a very", please insert -- low operating spring range and therefore impart only a --.

In column 1, line 42, "wiht" should read -- with --.

In column 1, line 59, "adn" should read -- and --.

In column 3, line 15, "mounting" should read -- mounted --.

In column 3, line 25, "alrge" should read -- large --.

In column 4, line 4, "is" should read -- it --.

Signed and Sealed this

Nineteenth Day of June, 1990

Attest:

HARRY F. MANBECK, JR.

*Attesting Officer*      *Commissioner of Patents and Trademarks*